June 4, 1946.  R. G. QUINN  2,401,314
MANUFACTURE OF REINFORCED ASBESTOS PAPER
Filed Sept. 23, 1943
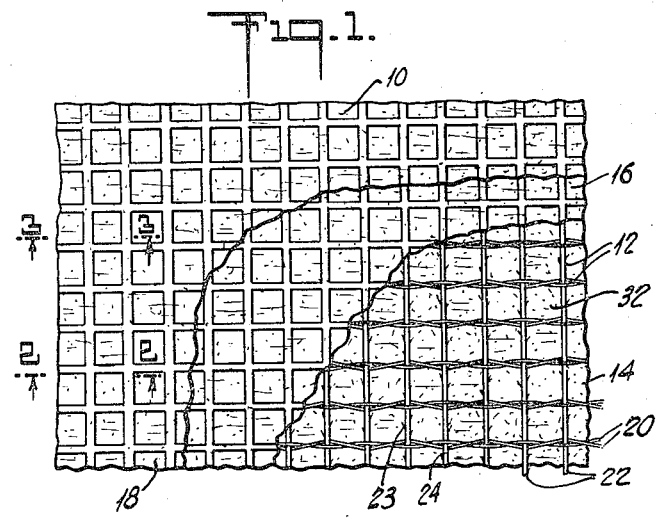
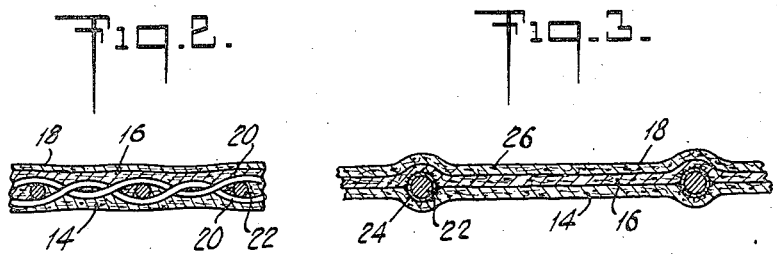
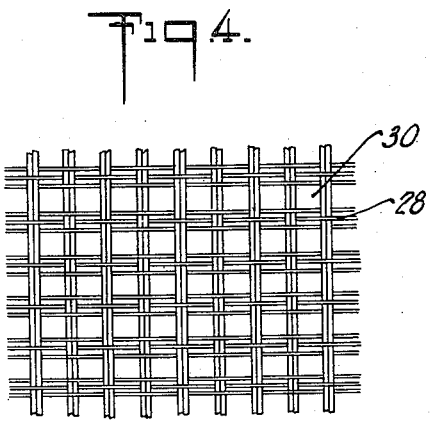
INVENTOR
ROBERT G. QUINN.
BY
ATTORNEY Patented June 4, 1946

2,401,314

UNITED STATES PATENT OFFICE 2,401,314

MANUFACTURE OF REINFORCED ASBESTOS PAPER

Robert G. Quinn, Bound Brook, N. J., assignor to Johns-Manville Corporation, New York, N. Y., a corporation of New York Application September 23, 1943, Serial No. 503,511

3 Claims. (Cl. 92—40)

This invention relates to thermal insulation, and is particularly concerned with reinforced asbestos paper laminate sheets and a method of manufacturing said sheets.

Thermal insulation sheets and tapes have been manufactured heretofore by embedding reinforcing fibers or fabrics between outer layers of comparatively weak asbestos fiber felts or papers. An object of the present invention is to provide a reinforced asbestos paper laminate sheet or tape having properties particularly adapting it for application as a smooth wrapping or covering for uneven surfaces such as tubular pipe insulation. For such purposes a sheet or tape must possess exceptionally high tensile and tear strength and have sufficient elasticity or stretch to conform closely to any curved or uneven surface to which it is applied.

A particular object is to provide a reinforced asbestos paper which exhibits stretch and flexibility without substantial loss of tensile strength on being wetted with water, and which possesses sufficiently high internal strength or resistance to delamination to withstand application by wrapping while wet on curved or uneven surfaces, followed by shrinkage drying, without delamination or loss of fireproofing and heat resisting properties.

Another object is to provide an improved method of manufacturing reinforced fire and heat resistant asbestos paper laminate sheets of substantially greater strength and durability as compared to reinforced sheets heretofore available.

A feature of the reinforced asbestos paper insulation sheet which forms the subject of the present invention is its extremely high tensile and tear strength and resistance to high temperatures. Such properties result primarily from the discovery that strong bonds can be developed between the asbestos fibers and a reinforcing fabric by employing a reinforcing fabric of coarse mesh woven scrim having its individual threads heavily sized or coated with a water sensitive adhesive such as corn starch, and by employing in the asbestos paper furnish a small amount of an adhesive sizing agent consisting of an oxidized starch gum.

With the above and other objects and features in view, the invention consists in the improved reinforced asbestos paper insulating sheets and method of manufacturing same, which are hereinafter described and more particularly defined by the accompanying claims.

The attached drawing presents illustrations of a preferred form of reinforced asbestos paper laminate sheet in accordance with the present invention. In the drawing:

Fig. 1 is a face view (magnified) of a scrim reinforced asbestos paper laminate, showing portions of two plies of asbestos paper at one face of the scrim, broken away to expose the scrim, and showing another ply of asbestos paper attached to the under face of the scrim;

Fig. 2 is a broken transverse sectional view taken on the line 2—2 of Fig. 1, and magnified to illustrate the twisted warp threads of the reinforcing fabric, and plies of felted asbestos paper superimposed thereon;

Fig. 3 is a broken transverse section on the line 3—3 of Fig. 1, magnified to illustrate the interfelting of the asbestos fibers and the bonds which are developed between the paper size and the fabric coating size; and Fig. 4 is a face view of a modified form of interwoven cotton thread reinforcing scrim which is adapted for use in the laminate sheets.

Referring to Fig. 1 of the drawing, a scrim reinforced asbestos paper laminate sheet 10 is illustrated which incorporates a coarse mesh, heavy double warp reinforcing scrim 12 embedded as a core between thin facing sheets 14, 16 and 18 of interfelted asbestos fiber paper. The reinforcing fabric 12 may have a mesh of 7 x 7 to the square inch. This fabric is shown as comprising fine twisted double warp threads 20, and heavy single coarse weft strands 22. The weft strands 22 are advantageously made of cotton fiber having short projecting fiber ends 23 which, during the sheet forming operation, interlock with and help to bond the asbestos fibers of the facing sheets to the reinforcing fabric. This interlocking bond between the rough fibrous weft strands of the reinforcing fabric and individual fibers of the asbestos paper facing sheets, is reinforced by the interlocking and felting which takes place between the fibers in the respective plies of the outer asbestos paper layers during the formation of the laminate sheet 10. Such interfelting results when the respective plies of asbestos paper are forced into the mesh openings of the reinforcing fabric and into tightly engaging contact with each other, during the formation of the multiply sheet.

A multi-ply reinforced asbestos paper of the type shown may be manufactured by slight variations in conventional paper making methods. For example, a thin aqueous pulp furnish of paper grade asbestos fibers and the indicated proportion of oxidized starch gum sizing is first produced in a beater or other mixing and defiberizing unit. Suitable asbestos fibers are those which have a size classification by the standard Quebec wet screen method of four ounces out of a 16 ounce sample retained on a 4 mesh screen, 8 ounces retained on a 10 mesh screen, and 4 ounces passed through a 10 mesh screen. From the beater or mixing unit the pulp furnish is run into a series of stock vats, in each of which a molding cylinder is rotatably mounted. Each cylinder on rotation removes a film of pulp from the vat and transfers it to an endless paper machine felt. A couching roll forces the felt into close engagement with the periphery of the molding cylinder during the web forming operation. After the first wet web or layer of lightly sized asbestos fibers has been transferred by the first molding cylinder to the felt, a heavily sized coarse mesh reinforcing scrim or fabric 12 is fed from a roll thereof into intimate contact with the lower face of the deposited web of asbestos fibers at a point between the first and second molding cylinders. Two additional plies or films of lightly sized asbestos fiber furnish are then successively deposited on the lower side of the reinforcing scrim as the felt passes over the second and third molding cylinders. Under the pressure of couch rolls the reinforcing scrim is incorporated in and embedded by the wet asbestos fiber webs, which are intimately contacted with each surface thereof. The couching rolls are used in conjunction with the molding cylinders to force asbestos fibers at opposite faces of the reinforcing fabric into intimate interlocking engagement with each other through the apertures or open mesh portions of the reinforcing fabric, and also into close contact engagement with the water dampened and softened starch films of each strand and thread of the reinforcing fabric. Additional strong bonds are developed between the particles of oxidized starch gum in the asbestos fiber webs and the starch sizing coats of the reinforcing fiber threads and strands when the reinforced sheet is finally dried. In this way a strongly bonded and reinforced multi-ply asbestos paper sheet may be rapidly formed. The sheet has sufficient wet strength so that after preliminary drying, it can withstand separation from the paper machine felts without delamination.

The properties of high tensile and tear strengths and of high internal strength or resistance to delamination, which characterize the reinforced asbestos paper laminate of the present invention, are due in large part to highly cohesive bonds which develop between the heavy sizing coats 24 of starch (for example, corn starch) on the threads and strands of the reinforcing fabric, and the dispersed sizing particles 26 of oxidized starch gum adhering to the asbestos fibers throughout the plies of asbestos paper. The starch coating on the reinforcing fabric should be heavy enough to constitute at least 15–20% of the total weight of the fiber. The adhesive starch gum sizing which is dispersed throughout the asbestos paper should be present only in small amounts comprising 1½–3% of the dry weight of the asbestos fibers.

A multi-ply reinforced asbestos paper sheet 10 of the type described normally possesses a dry weight of about 10–14 lbs. per 100 sq. ft., and an average thickness of .03–.04 inch. A sample sheet weighing 12 lbs. per 100 square ft. exhibited on test a dry tensile strength in excess of 35 lbs. per inch of width, a wet tensile strength greater than 30 lbs. per inch of width, and a transverse strength greater than 28 lbs. per inch. The tear strength of the sheet by the Elmendorf tear test exceeds 3000 grams. The internal strength or resistance to delamintaion of a test sheet was measured by sticking a sheet of the paper between two wooden blocks by means of hot asphalt adhesive, and pulling the sample apart in a Scott tensile machine. Under this test the internal strengths of samples thus tested average 6.5–7 lbs. per square inch. The Mullen bursting strength of such sheets exceeds 70 lbs. per square inch. About 80% of the total weight of such sheets consists of asbestos fibers. Approximately ⅔ of the total weight of the asbestos fibers in the reinforced sheet are normally disposed in the two outer plies of asbestos paper on one side of the reinforcing fabric, with the balance of the asbestos fibers in the single ply paper on the other side of the fabric.

The dry sheets will withstand temperatures in excess of 500° F. for long periods without exhibiting any substantial delamination or weakening. Sheets of the indicated composition can be made on paper machines operating at speeds of the order of 50 or more ft. per minute. The mulit-ply reinforced asbestos paper sheets herein described have tensile strengths and internal strengths (i. e. delamination resistance) at least 35–40% greater than sheets of similar composition and weight but omitting the presence of the heavy starch coating on the reinforcing fabric. While such starch coating is insoluble in cold water, it does swell or expand and soften somewhat in the presence of water, and during this softened condition it maintains a cohesive bond with the oxidized starch gum sizing which is present in the asbestos paper webs.

Laminate asbestos paper sheets which have been reinforced with scrim which is heavily sized with starch, stretch to some extent when moistened with water. This characteristic of the sheet is particularly useful when applying tapes of the sheet material as wrappings around curved and uneven surfaces and around refractory or insulation conduits. By moistening edges of the reinforced laminate asbestos paper tape with water, just before applying it as an outer wrapping around a pipe or conduit, and by then drying the wrapping after it has been applied, the edges shrink on drying sufficiently to provide a very tightly fitting and smooth outer wrapping. The multi-ply tape is usually applied as a wrapping with the double ply of asbestos paper forming the outside exposed surface, thereby providing maximum flame-proofing and heat-resistance protection on that surface. Each outer ply or layer of asbestos paper has a thickness of about 4 mils, and two such thicknesses have been found ample to flame-proof the product by protecting the embedded reinforcing fabric from possible carbonization or combustion within temperature ranges of 400–500° F.

The coarse 7 x 7 mesh double twisted warp thread reinforcing fabric is illustrated by Figs. 1 to 3 has a maximum thickness in the neighborhood of .022 inch at the points at which the double warp threads overlap the weft strands. It has been found that a fabric 28 embodying fine twisted warp and weft threads woven in the manner illustrated in Fig. 4 can be substituted for the coarser fabric 12 of Fig. 1, and when properly sized with 15–20% corn starch, will provide a reinforced sheet which is the equivalent in strength and delamination resistance of the sheet 10 previously described, and which is of lower average thickness in the range .020–.025 inch. In the reinforcing fabric 28 of Fig. 4 the principal mesh openings or spaces 30 between the double weft threads and adjacent rows of warp threads are somewhat smaller (Figs. 1 and 4 are magnified to the same degree) than the mesh openings 32 of fabric 12. Such mesh openings 30 and 32 should provide areas not substantially smaller than .01 sq. inch to afford opportunity for interfelting and interlocking of asbestos fiber facing sheets within the mesh interstices. To counterbalance the adverse effect of its finer mesh on this sheet interlocking operation, the fabric 28 of Fig. 4 is constructed of finer thread and therefore has an average thickness much less than that of fabric 12.

Use of a reinforcing fabric such as 28 of Fig. 4 has an additional advantage in yielding a reinforced laminate sheet or tape having a smoother outer surface, which can be more readily finished by application of an outer coating of paint or other finishing coat.

Since many variations may be made from the illustrative details given, without departing from the scope of the invention, it is intended that the invention should be limited only by the terms of the claims interpreted as broadly as consistent with novelty over the prior art.

What I claim is:

1. In manufacturing multi-ply reinforced asbestos paper sheets the steps comprising, successively transferring to a felting surface from an aqueous furnish wet webs of asbestos fibers lightly sized with 1½–3% of the fiber weight of oxidized starch gum, interposing between two successively deposited webs of asbestos a reinforcing scrim having mesh openings not substantially finer than .01 sq. inch and having woven warp and weft strands heavily coated with 15–20% of the scrim weight of water sensitive starch adhesive, and applying sufficient pressure to force the wet webs of asbestos paper into tightly bonding relation with both faces of the scrim and to develop interfelting of fibers of the successively deposited webs within the interstices of the scrim.

2. In manufacturing multi-ply reinforced asbestos paper sheets, the steps comprising, transferring to a felting surface from an aqueous furnish at least one wet web of asbestos fibers lightly sized with 1½–3% of the fiber weight of oxidized starch gum, forcing into laminate contact with said deposited asbestos fiber film a reinforcing scrim having mesh openings, not substantially finer than .01 sq. inch and having woven warp and weft strands heavily coated with 15–20% of the scrim weight of water sensitive starch adhesive, and facing the exposed surface of such scrim with at least two layers of asbestos paper lightly sized with oxidized starch gum by successively transferring wet webs of said sized fibers to said surface from an aqueous furnish thereof.

3. A multi-ply reinforced asbestos paper sheet comprising, a reinforcing scrim having mesh openings not substantially finer than .01 sq. inch and consisting of woven warp and weft strands heavily coated with 15–20% of the scrim weight of starch adhesive, said scrim being embedded in and wholly covered by thin sheets of asbestos fiber paper sized with 1½–3% oxidized starch gum, the layers of paper being strongly bonded to said scrim and interlocked with each other within the interstices of the scrim.

ROBERT G. QUINN.